United States Patent Office 3,646,112
Patented Feb. 29, 1972

3,646,112
PERFLUOROPOLYETHER ESTERS
John Deo Sterling, Jr., Wenonah, N.J., assignor to E. I. du Pont de Nemours and Company, Wilmington, Del.
No Drawing. Filed Jan. 26, 1970, Ser. No. 5,991
Int. Cl. C07c 69/66
U.S. Cl. 260—484 R          6 Claims

ABSTRACT OF THE DISCLOSURE

Esters of the structural formula

wherein —$C_mF_{2m}O$— has the structure

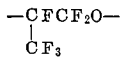

or —$CF_2CF_2O$—; $y$ is a cardinal number between and including 1 and 4; $n$ is a cardinal number between and including 0 and 20; R is alkyl of 1–4 carbon atoms; $a$ is 0 or 1; and when —$C_mF_{2m}O$— is

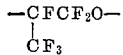

X is $CF_3$; and when —$C_mF_{2m}O$— is —$CF_2CF_2O$— X is F. The esters are prepared from the corresponding acyl fluoride and either a trimethylolalkane or pentaerythritol. The esters are useful as lubricants and hydraulic fluids.

BACKGROUND OF THE INVENTION

(1) Field of the invention

This invention relates to prefluoropolyether esters, and, more specifically, is directed to perfluoropolyoxoalkanoates of trimethylolalkanes or pentaerythritol.

(2) Description of the prior art

Straight and branched chain saturated aliphatic hydrocarbyl carboxylic acid triesters of trimethylolalkanes and the corresponding tetraesters of pentaerythritol are useful as lubricants and hydraulic fluids, e.g., in aircraft turbine engines. However their use is limited because of their flammability which necessitates frequent maintenance to guard against leaks in the lubricant or hydraulic lines. An object of this invention is to provide such fluids that are non-flammable, that are inexpensive to produce, and that are relatively of high density.

SUMMARY OF THE INVENTION

Esters of the structural formula

[F(CF$_2$)$_y$O(C$_m$F$_{2m}$O)$_n$CF(X)COOCH$_2$]$_{4-a}$C(R)$_a$ wherein —$C_mF_{2m}O$— has the structure

or —$CF_2CF_2O$—; $y$ is a cardinal number between and including 1 and 4; $n$ is a cardinal number between and including 0 and 20; R is alkyl of 1–4 carbon atoms; $a$ is 0 or 1; and when —$C_mF_{2m}O$— is

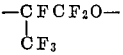

X is —$CF_3$; and when —$C_mF_{2m}O$— is —$CF_2CF_2O$— X is F.

DESCRIPTION OF THE INVENTION

The esters of this invention are prepared by reacting either the perfluoropolyether acyl fluoride (a)

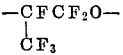

or (b)

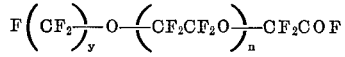

with (c) $C(CH_2OH)_3R$ where R is methyl, ethyl, propyl or butyl, i.e., a trimethylolalkane, or (d) $C(CH_2OH)_4$, pentaerythritol.

The reaction is carried out in a ratio of the acyl fluoride (a) or (b) to the polyol (c) or (d) such that at least one mole of (a) or (b) is present for each OH group in (c) or (d). Usually the reaction is carried out in the presence of a solvent that also acts to neutralize the HF byproduct that is evolved, but which is otherwise inert. Tertiary amines, e.g., pyridine, are useful solvents. Any suitable equipment may be employed, e.g., a glass or stainless steel vessel, that is provided with heating, cooling and agitation means. The reaction is carried out under essentially anhydrous conditions by adding the reactants and mixing them. Ordinarily, about a 2 to 10% molar excess of the acyl fluoride for each hydroxyl group of the polyol (c) or (d) is employed. The reaction is exothermic and addition of the reactants into the solvent must be carefully carried out to prevent excessive heat evolution.

Reaction time and temperature will vary with the molecular weight of the acyl fluoride employed. With the higher molecular weight acyl fluorides, i.e., those where $n$ is a high value (e.g. 14 to 20) from one up to twenty hours at 100° C. may be required to esterify all the hydroxyl groups of the polyol reactant. With lower molecular weight acyl fluorides, complete esterification in less than one hour at temperatures of between about 20° C. and 60° C. will occur. Completeness of the esterification can be measured by periodic infrared analysis of the reaction mass, since esterification will be essentially complete when infrared absorptions due to alcoholic hydroxyl disappears and when ester carbonyl absorption reaches a maximum.

Pressure employed is not critical, and ordinarily atmospheric pressures are used.

The ester product can be isolated from the reaction mass by ordinary purification techniques, e.g., by vacuum stripping to remove excess acyl fluoride followed by water washing to remove amine salt. The ester material can then be dried (e.g. by vacuum stripping, heating or by contact with a dehydrating agent). The material can also be washed with dilute sodium or potassium carbonate or bicarbonate solution and washed with water.

A second low-boiling inert solvent for the reaction product can be employed to facilitate separation of the ester product from the reaction mass. Such media include ethers, such as diethylether, tetrahydrofuran, lower dialkyl ethers of lower polyethylene glycols; and chlorofluoroalkanes, such as trichlorotrifluoroethane.

Acyl fluoride reactants of Formula a above can be prepared by reacting hexafluoropropylene epoxide

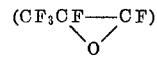

with itself (to obtain reactant (a) where $y$ is 3) or with fluoroalkanoic acid fluorides (to obtain reactant (a) where $y$ is 1, 2, 3 or 4). Procedures for obtaining reactant (a) are described in detail in U.S. Pats. 3,250,808; 3,322,826 and 3,274,239.

Acyl fluoride reactants of Formula b where $y$ is 2 can be prepared by contacting tetrafluoroethylene oxide with activated charcoal as described in U.S. Pat. 3,125,599. Reactants of Formula b where $y$ is 1, 3 or 4 can be prepared as described in the preceding paragraph by substituting tetrafluoroethylene epoxide for hexafluoropropylene epoxide.

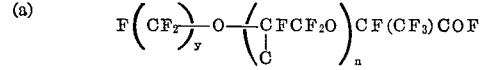

Preferred esters of this invention are those of the formula

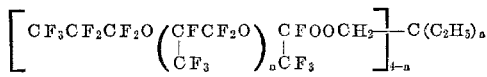

where $a$ and $n$ are as defined previously. These esters have high resistance to fire or burning (most have fire points in excess of 350° C. as determined by A.S.T.M. method D-92 and densities of at least 1.6 g. per ml. at 25° C.

All the esters of this invention are useful as lubricants and hydraulic fluids. Their non-flammability, density and viscosities make them particularly useful in submerged undersea lubrication application where lighter lubricants would be displaced by seawater through leakage. Water flooding of undersea gear cases is thus minimized.

The examples which follow illustrate the invention in greater detail. All parts are by weight unless otherwise specified.

EXAMPLE 1

To a stirred mixture of 12.5 parts (0.093 mole) trimethylol propane, 50 parts (0.6 mole) pyridine and 180 parts tetrahydrofuran, protected from atmospheric moisture by an atmosphere of dry nitrogen, were added dropwise 168 parts (0.36 mole) of the acyl fluoride

at a rate such that the temperature of the reaction mass did not exceed 28° C. The temperature was then increased to 40° C. and maintained there for 30 minutes. The reaction mass was then allowed to cool to room temperature and sufficient water was then added to cause the reaction mass to separate into two phases. The denser phase was diluted with about 100 parts of trichlorotrifluoroethane and separated from the less dense phase. The denser phase was washed several times with 10 weight percent aqueous potassium carbonate and finally with water. The resulting liquid was dried by contacting it with anhydrous calcium sulfate. The trichlorotrifluoroethane was evaporated by heating and vacuum stripping to obtain 99 parts of a clear, pale yellow oil.

Infrared analysis of the oil showed the substantial absence of hydroxyl groups and showed typical absorption of ester carbonyl. The product, identified as

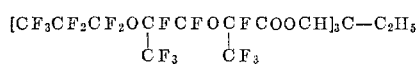

had a density of 1.66 g. per ml. at 25° C. and a kinematic viscosity of 15.4 cs. at 37.8° C.

EXAMPLES 2–9

Using essentially the procedure of Example 1, the following tabulated esters of this invention were obtained from the following tabulated acyl fluoride and polyol reactants:

| Example | Reactants | Ester product |
|---|---|---|
| 2 | $CF_3CF_2CF_2O(CFCF_2O)_2CFCOF$ (with $CF_3$, $CF_3$) + $C(CH_2OH)_3C_2H_5$ | $[CF_3CF_2CF_2O(CFCF_2O)_2CFCOOCH_2]_3CC_2H_5$ (with $CF_3$, $CF_3$) |
| 3 | $CF_3CF_2CF_2O(CFCF_2O)_3CFCOF$ (with $CH_3$, $CF_3$) + $C(CH_2OH)_3C_2H_5$ | $[CF_3CF_2CF_2O(CFCF_2O)_3CFCOOCH_2]_3CC_2H_5$ (with $CF_3$, $CF_3$) |
| 4 | $CF_3CF_2CF_2O(CFCF_2O)_5CFCOF$ (with $CF_3$, $CF_3$) + $C(CH_2OH)_3C_2H_5$ | $[CF_3CF_2CF_2O(CFCF_2O)_5CFCOOCH_2]_3CC_2H_5$ (with $CF_3$, $CF_3$) |
| 5 | $CF_3CF_2CF_2O(CFCF_2O)_{14}CFCOF$ (with $CF_3$, $CF_3$) + $C(CH_2OH)_3C_2H_5$ | $[CF_3CF_2CF_2O(CFCF_2O)_{14}CFCOOCH_2]_3CC_2H_5$ (with $CF_3$, $CF_3$) |
| 6 | $CF_3CF_2CF_2O(CFCF_2O)CFCOF$ (with $CF_3$, $CF_3$) + $C(CH_2OH)_4$ | $[CF_3CF_2CF_2O(CFCF_2O)CFCOOCH_2]_4C$ (with $CF_3$, $CF_3$) |
| 7 | $CF_3CF_2CF_2O(CFCF_2O)_2CFCOF$ (with $CF_3$, $CF_3$) + $C(CH_2OH)_4$ | $[CF_3CF_2CF_2O(CFCF_2O)_2CFCOOCH_2]_4C$ (with $CF_3$, $CF_3$) |
| 8 | $CF_3CF_2CF_2O(CFCF_2O)_5CFCOF$ (with $CF_3$, $CF_3$) + $C(CH_2OH)_4$ | $[CF_3CF_2CF_2O(CFCF_2O)_5CFCOOCH_2]_4C$ (with $CF_3$, $CF_3$) |
| 9 | $CF_3CF_2CF_2O(CFCF_2O)_9CFCOF$ (with $CF_3$, $CF_3$) + $(CH_2OH)_4$ | $[CF_3CF_2CF_2O(CFCF_2O)_9CFCOOCH_2]_4C$ (with $CF_3$, $CF_3$) |

Properties of the products of the above examples are listed as follows:

| Example | Density, g./ml. 25° C. | Kinematic viscosity, cs. 37.8° C. | Kinematic viscosity, cs. 98.9° C. | Fire point A.S.T.M.–D-92 (° C.) |
|---|---|---|---|---|
| 2 | >1.6 | 47.8 | 5.2 | (1) |
| 3 | 1.77 | 64.0 | 6.8 | >350 |
| 4 | 1.82 | 104.8 | 10.1 | >350 |
| 5 | >1.8 | 363.9 | 29.8 | >350 |
| 6 | 1.74 | 19.6 | (2) | (1) |
| 7 | >1.7 | 63.3 | 6.75 | (1) |
| 8 | 1.83 | 133.1 | 13.7 | >350 |
| 9 | 1.85 | 278.5 | (2) | >350 |

[1] Material volatilized before fire point was reached. The vapors did not flame.
[2] No measurement was made.

The following representative esters of this invention can be prepared by the general procedure of Example 1:

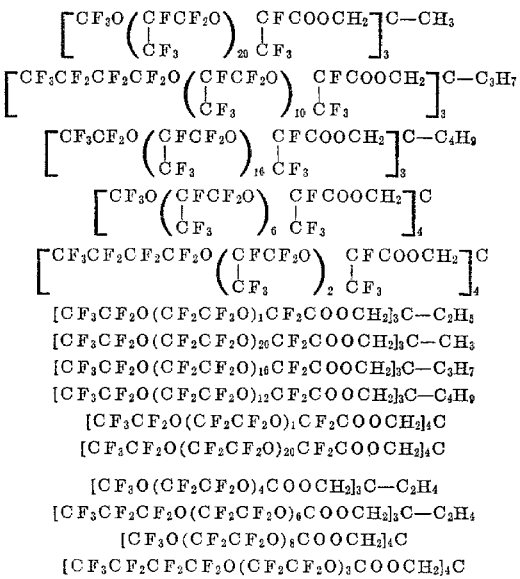

$[CF_3CF_2O(CF_2CF_2O)_1CF_2COOCH_2]_3C—C_2H_5$
$[CF_3CF_2O(CF_2CF_2O)_{26}CF_2COOCH_2]_3C—CH_3$
$[CF_3CF_2O(CF_2CF_2O)_{16}CF_2COOCH_2]_3C—C_3H_7$
$[CF_3CF_2O(CF_2CF_2O)_{12}CF_2COOCH_2]_3C—C_4H_9$
$[CF_3CF_2O(CF_2CF_2O)_1CF_2COOCH_2]_4C$
$[CF_3CF_2O(CF_2CF_2O)_{20}CF_2COOCH_2]_4C$ $[CF_3O(CF_2CF_2O)_4COOCH_2]_3C—C_2H_4$
$[CF_3CF_2CF_2O(CF_2CF_2O)_6COOCH_2]_3C—C_2H_4$
$[CF_3O(CF_2CF_2O)_8COOCH_2]_4C$
$[CF_3CF_2CF_2O(CF_2CF_2O)_3COOCH_2]_4C$

In general the lower molecular weight esters (i.e., low values of $n$) generally have low viscosities, are water insoluble and are useful as light lubricants; while the higher molecular weight esters generally have higher viscosities, are water insoluble and are useful as high temperature, heavy lubricants and damping fluids. The esters of this invention can of course be mixed to provide lubricants of intermediate viscosities. If desired the esters of this invention can be rendered resistant to high temperature oxidative decomposition (even though essentially non-flammable, the esters can decompose oxidatively at temperatures above between about 205° C. and above 350° C.) by mixing them with stabilizing amounts of naphthol esters, such as those of the formula $$F(CF_2)_yO(C_mF_{2m}O)_nCF(X)COO\text{---}Z$$

where $y$, $m$, $n$ and X are as previously defined and Z is an $\alpha$ or $\beta$ naphthyl group.

The preceding representative examples may be varied within the scope of the present total specification disclosure, as understood and practiced by one skilled in the art, to achieve essentially the same results.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. An ester of the structural formula $$[F(CF_2)_yO(C_mF_{2m}O)_nCF(X)COOCH_2]_{4-a}C(R)_a$$

wherein —$C_mF_{2m}O$— has the structure

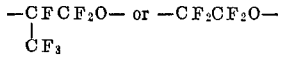

$y$ is a cardinal number between and including 1 and 4; $n$ is a cardinal number between and including 0 and 20; R is alkyl of 1–4 carbons atoms; $a$ is 0 or 1; and when —$C_mF_{2m}O$— is

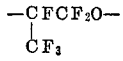

X is —$CF_3$; and when —$C_mF_{2m}O$— is —$CF_2CF_2O$— X is F.

2. An ester of claim 1 wherein —$C_mF_{2m}O$— has the structure

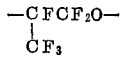

3. An ester of claim 2 wherein $a$ is zero.
4. An ester of claim 2 wherein $a$ is 1.
5. An ester of claim 3 wherein $y$ is 3.
6. An ester of claim 4 wherein $y$ is 3 and R is —$C_2H_5$.

References Cited

UNITED STATES PATENTS

| | | | |
|---|---|---|---|
| 3,250,807 | 5/1966 | Fritz et al. | 260—535 |
| 3,535,369 | 10/1970 | Sianesi et al. | 260—473 |

JAMES A. PATTEN, Primary Examiner

P. J. KILLOS, Assistant Examiner

U.S. Cl. X.R.

252—54.6, 79; 260—544 F